United States Patent
Chan et al.

(10) Patent No.: US 6,381,249 B1
(45) Date of Patent: Apr. 30, 2002

(54) TANDEM PASS THROUGH IN A SWITCHED CALL

(75) Inventors: Christina Kwok-Han Chan, Northridge; Lois Marie Greer, Simi Valley, both of CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/074,868

(22) Filed: May 8, 1998

(51) Int. Cl.[7] .............................. H04J 3/16; H04J 3/22
(52) U.S. Cl. ...................................... 370/465
(58) Field of Search ............................... 370/395, 229, 370/230, 231–6, 351–3, 465–9, 477, 276, 277–8, 503, 522

(56) References Cited

U.S. PATENT DOCUMENTS

| | | | | |
|---|---|---|---|---|
| 5,297,147 A | * | 3/1994 | Shimokasa | 370/118 |
| 5,555,377 A | * | 9/1996 | Christensen et al. | 395/200.11 |
| 5,784,358 A | * | 7/1998 | Smith et al. | 370/230 |
| 5,956,729 A | * | 9/1999 | Goetz et al. | 707/104 |
| 6,044,107 A | * | 3/2000 | Gatherer et al. | 375/222 |
| 6,058,462 A | * | 5/2000 | West et al. | 711/162 |
| 6,108,304 A | * | 8/2000 | Abe et al. | 360/232 |

* cited by examiner

Primary Examiner—David R. Vincent
(74) Attorney, Agent, or Firm—Blakely Sokoloff Taylor & Zafman LLP (57) ABSTRACT

A system and method to enable compressed information to be transferred over a tandem connection. Briefly stated, the method features detection of a tandem connection separating a first node and a second node. These nodes are attached to a networking device of the tandem connection via a first signal line and a second signal line, respectively. Upon detection, encoded information is exchanged through the tandem connection in order to identify a first rate of transmission and a first compression function supported by the first signal line and a second rate of transmission and a second compression function supported by the second signal line. If the first rate of transmission and the first compression function are equivalent to the second rate of transmission and the second compression function, the information in a compressed format is transferred through the tandem connection.

19 Claims, 8 Drawing Sheets

FIG. 8

TANDEM PASS THROUGH IN A SWITCHED CALL

BACKGROUND

1. Field

The present invention relates to the field of data communications. In particular, this invention relates to a system and method to eliminate degradation of information being transferred.

2. General Background

In digital communication networks, calls can be made through one or more tandem connections. A "tandem connection" comprises a networking device (e.g., a Private Branch Exchange "PBX") coupled between tandem digital channels. In order to optimize bandwidth (the amount of information transmitted per second), compression is performed. Normally, whenever lossy compression information is compressed, a certain amount of that information is lost.

Normally, for audio communications, upon encountering a tandem connection, compressed audio over the first tandem channel undergoes (i) decompression, (ii) transmission to a second tandem channel, and (iii) compression. These decompression and compression operations cause significant degradation in the clarity of the audio as well as increased signal latency during transmission. To solve this problem, techniques have been developed to detect the presence of a tandem channel and to pass the compressed audio directly through a networking device, thereby eliminating additional decompression and compression operations. The disadvantage associated with the current technique is that there is no method to verify that the tandem channels are operating at the same rate and with the same compression algorithm. This is important in switched networks where the audio and/or data compression algorithms are negotiated. If a compressed audio signal is transferred to a tandem channel running a different compression algorithm and/or at a different rate, severe degradation of the audio signal will result.

Hence, it would be advantageous to provide a system and method for detecting the presence of a tandem channel and, at the same time, detecting the compression algorithm and rate of the tandem channel. This would provide more flexibility for switched networks to eliminate decompression and compression operations, and thus, would assist in reducing distortion of information.

SUMMARY OF THE INVENTION

One embodiment of the present invention relates to a method for reducing the distortion of data passed through a tandem connection. This is accomplished by transferring the data in a compressed format instead of decompressing and recompressing that data. The method comprises an initial operation of exchanging information concerning characteristics of signal lines, separated by the tandem connection, through the tandem connection. If these signal lines possess the same characteristics, such as supporting the same transmission rate and utilizing the same compression function, information is transferred through the tandem connection in its compressed format.

BRIEF DESCRIPTION OF THE DRAWINGS

The features and advantages of the present invention will become apparent from the following detailed description of the present invention in which.

DETAILED DESCRIPTION OF AN EMBODIMENT

Herein, embodiments of the present invention relate to a system and method for detecting a tandem connection, and in response, performing a procedure that reduces the amount of degradation experienced by the information during transmission through the tandem connection. This may be accomplished by eliminating unnecessary decompression and compression operations on information transmitted through the tandem connection for example.

Herein, certain terminology is used to describe various features of the present invention. In general, a "system" comprises the connection of multiple signal lines to one or more networking device(s) and node(s). A "signal line" includes any communications link capable of transmitting digital information at some ascertainable bandwidth. Examples of a signal line include T1/E1, frame relay, private leased line, satellite, microwave, fiber optic, cable, wireless communications (e.g., radio frequency "RF") or even a logical link. "Information" generally comprises a signal having one or more bits of data, address, control or any combination thereof. For example, information may include audio signals, video signals, fax/modem signals or any combination thereof.

With respect to the particulars of the system, a "networking device" comprises a combination of hardware and software used to transfer information between a source and a destination such as tandem, digital channels when the networking device is part of a tandem connection. An example of a networking device may include, but is not limited or restricted to a digital Private Branch Exchange (PBX). A "node" is a combination of hardware and software used to transfer information to/from a networking device over one or more tandem channels. Examples of a node include a removable communication card placed in a digital platform (e.g., computer, server, set-top box, etc.) or a network multiplexer.

Figure 1:
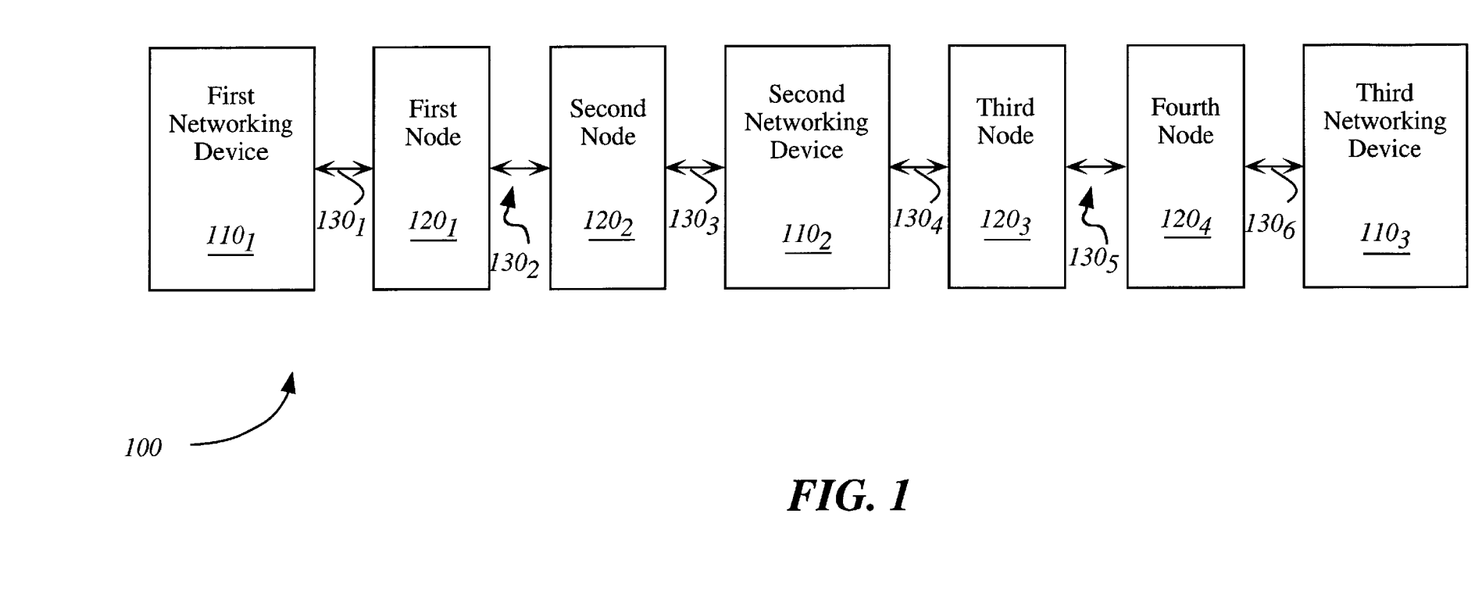
FIG. 1 is an illustrative embodiment of a system comprising a number of nodes operating in accordance with the present invention.

Referring to FIG. 1, an illustrative embodiment of a system utilizing the present invention is shown. Herein, system 100 includes one or more networking devices $110_1$–$110_3$ connected to a plurality of nodes (e.g., nodes $120_1$–$120_4$) through signal lines $130_1$–$130_6$. In particular, system 100 includes a second node $120_2$ coupled between a signal line $130_2$ and signal line $130_3$, while a third node $120_3$ is coupled between a fourth signal line $130_4$ and a fifth signal line $130_5$. Both signal lines $130_3$ and $130_4$ are further coupled to networking device $110_2$ such as a private branch exchange (PBX).

In particular, third signal line $130_3$ is capable of routing information to/from networking device $110_2$, either (i) in a compressed format (hereinafter referred to as "compressed information") or (ii) in a normal, decompressed format produced at a selected transmission rate (e.g., pulse code modulated "PCM" signals at 64 kilobits per second "Kbps"). Fourth signal line $130_4$ is capable of routing compressed or decompressed information to/from third node $120_3$. The compression may be in accordance with any well-known compression function in order to produce compressed information such as, for example, a stream of modulated data compressed at a predetermined rate. As described below, for illustrative sake, the information may be described as PCM audio. It is contemplated, however, that any type of information (e.g., a video, fax, modem) and any selected transmission rate may be used.

As a call is connected from first networking device $110_1$ to second networking device $110_2$, first and second nodes $120_1$ and $120_2$ negotiate their common compression algorithm and rate. The second node $120_2$ starts a tandem passthrough (TPT) detection procedure described below. If the call continues to connect from second networking device $110_2$ to third networking device $110_3$, the third and fourth nodes $120_3$ and $120_4$ negotiate their common compression algorithm and rate. Thereafter, third node $120_3$ starts the TPT detection procedure. The TPT detection procedure allows second and third nodes $120_2$ and $120_3$ to dynamically detect the presence of a tandem connection, and at the same time, determine whether these nodes are running the same compression algorithm and rate. If second and third nodes $120_2$ and $120_3$ determine that they are compatible, the compressed PCM audio will be routed directly through second networking device $110_2$. Otherwise, the compressed PCM audio is decompressed before being routed to second networking device $110_2$. The TPT detection procedure is performed through the use of a synchronization (SYNC) pattern, which is embedded in the PCM audio as discussed below.

Figure 2:
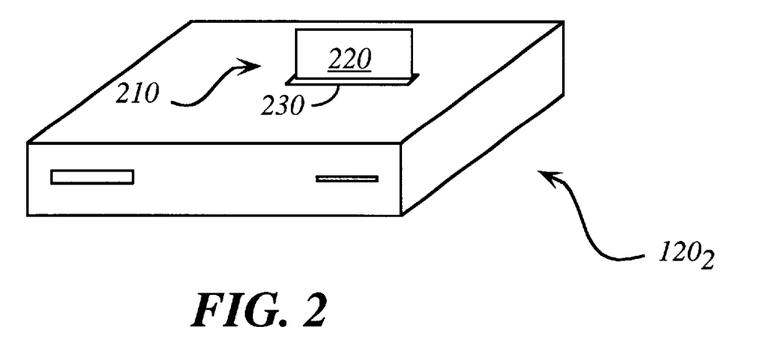
FIG. 2 is an illustrative embodiment of a node of FIG. 1 which utilizes the present invention.

Referring now to FIG. 2, an illustrative embodiment of node $120_2$ is shown. The node $120_2$ comprises a communication module 210 including a substrate 220 which is formed with any type of material or combination of materials upon which integrated circuit (IC) devices can be attached. Communication module 210 is adapted to exchange information with other logic, within a computer for example, through a connector 230. Any style for connector 230 may be used, including a standard female edge connector, a pin field connector, a socket, a Network Interface Card connection and the like.

Figure 3:
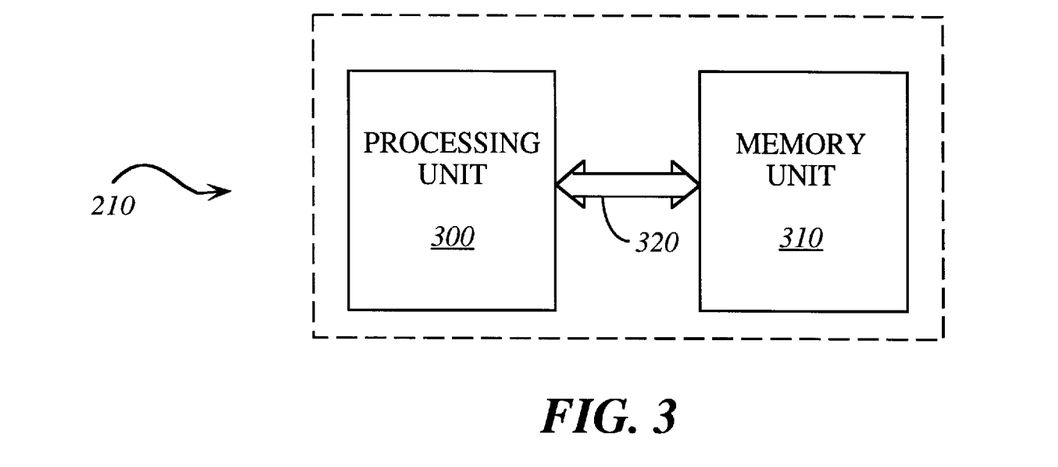
FIG. 3 is an illustrative embodiment of a communication module employed within the node of FIG. 2.

Referring now to FIG. 3, communication module 210 includes one or more processing unit(s) 300 and corresponding memory unit(s) 310. The processing unit(s) may be general purpose microprocessors, digital signal processors, micro-controllers or other logic having code processing capabilities. The memory unit(s) 310 may be non-volatile memory, or even volatile memory if the tandem software is capable of being reloaded after power-down of node $120_2$. These units 300 and 310 are coupled together by a signal line 320 to exchange information. As briefly described, at least one memory unit is adapted to contain software performing the TPT detection procedure to avoid unnecessary decompression of the compressed PCM audio.

Figure 4:
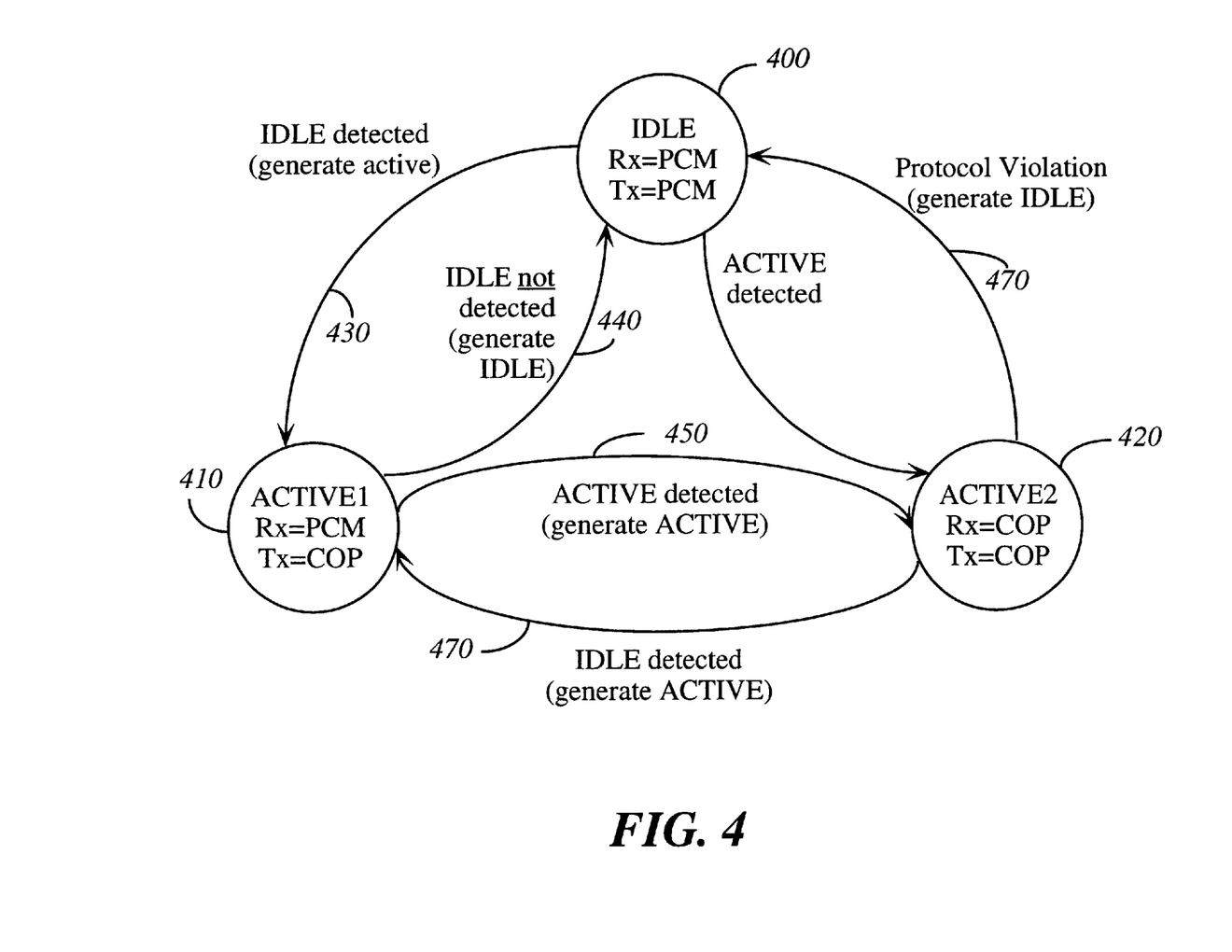
FIG. 4 is an illustrative embodiment of a state diagram featuring the operational states of a node.

Referring to FIG. 4, a state diagram featuring an embodiment of the operational states of each node (e.g., node $120_2$)

of a tandem connection during the TPT detection procedure is shown. Herein, the operational states include an IDLE state 400, an ACTIVE1 state 410 and an ACTIVE2 state 420. Initially, a node is placed in the IDLE state 400. During the IDLE state 400, the node is capable of producing an IDLE sequence, namely a sequence of PCM samples including a bit pattern. In addition, the node also is capable of monitoring for receipt of either an IDLE sequence or an ACTIVE sequence (described below) from another node of the tandem connection.

Figure 5:
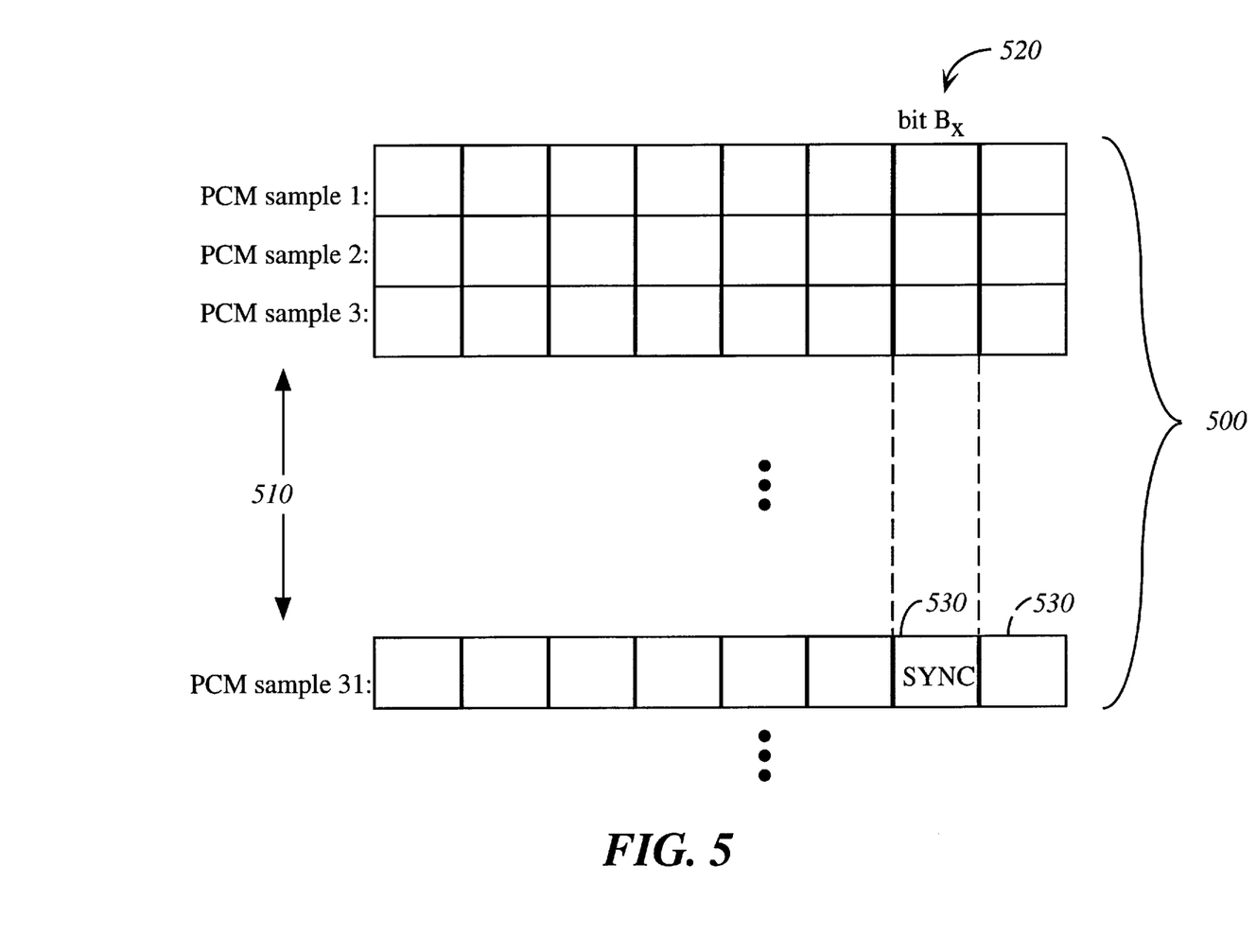
FIG. 5 is an illustrative embodiment of an IDLE sequence produced by a node inclusive of a synchronization (SYNC) pattern.

Referring now to FIG. 5, IDLE sequence 500 includes a sequence of PCM samples 510 collectively encoded with a N-bit pattern ("N" being a positive whole number). This N-bit pattern, referred to as a synchronization "SYNC" pattern 520, is a predetermined code to identify the audio algorithm and transmission rate supported by the tandem channel through which the PCM samples originated. In this embodiment, SYNC pattern 520 is encoded into a selected bit (bit $B_x$; "x"$\geq$0) 530 of every $M^{th}$ PCM sample ('M' being a positive whole number normally greater than 20). For the IDLE sequence, in this embodiment, "M" is equal to thirty-one (31). Thus, successive bits of the SYNC pattern are encoded into a bit $B_x$ of every $31^{st}$ PCM sample in order to avoid artifacts such as clicking noises or low level bursts of noise. Of course, this encoding scheme may be adjusted to encode more or less frequently than every $31^{st}$ PCM sample. Herein, bit $B_x$ 530 comprises bit 1 of each $31^{st}$ PCM sample of a PCM stream configured with a T1 carrier as shown. Bit $B_x$ 530 comprises bit 0 of each $31^{st}$ PCM sample of a PCM stream configured in accordance with a E1 carrier as shown through dashed lines.

As shown below in Table A, it is contemplated that certain bits of SYNC pattern 520 may be used for identification, for example, the four (4) least significant bits of SYNC pattern 520 as shown in Table A. In this illustrative embodiment, upon providing "N×31" PCM samples, the entire SYNC pattern has been produced for transmission.

TABLE A

| Sync Pattern (in Hex) | Audio Compression Algorithm (ITU Standard Speech Compression Algorithms) |
|---|---|
| 7062H | G.729 |
| 7063H | G.728 |
| 7064H | G.726 (32 Kbps) |
| 7065H | G.726 (24 Kbps) |
| 7066H | G.726 (16 Kbps) |
| 7068H | G.723 |

With respect to detection of the IDLE sequence, bit $B_x$ of appropriate, incoming PCM samples is stored in a buffer for subsequent comparison by the processing unit. It is contemplated that, if after a predetermined number of samples of bit $B_x$ are recovered and no match has been detected, the next bit $B_x$ sample is taken on the $(M-1)^{th}$ (e.g., $30^{th}$) sample. Then, the detection procedure continues as described above, sampling bit $B_x$ every $30^{th}$ sample. This sampling and shifting of the detection window could continue until the certain contents in the buffer compare with SYNC pattern 520.

Figure 6:
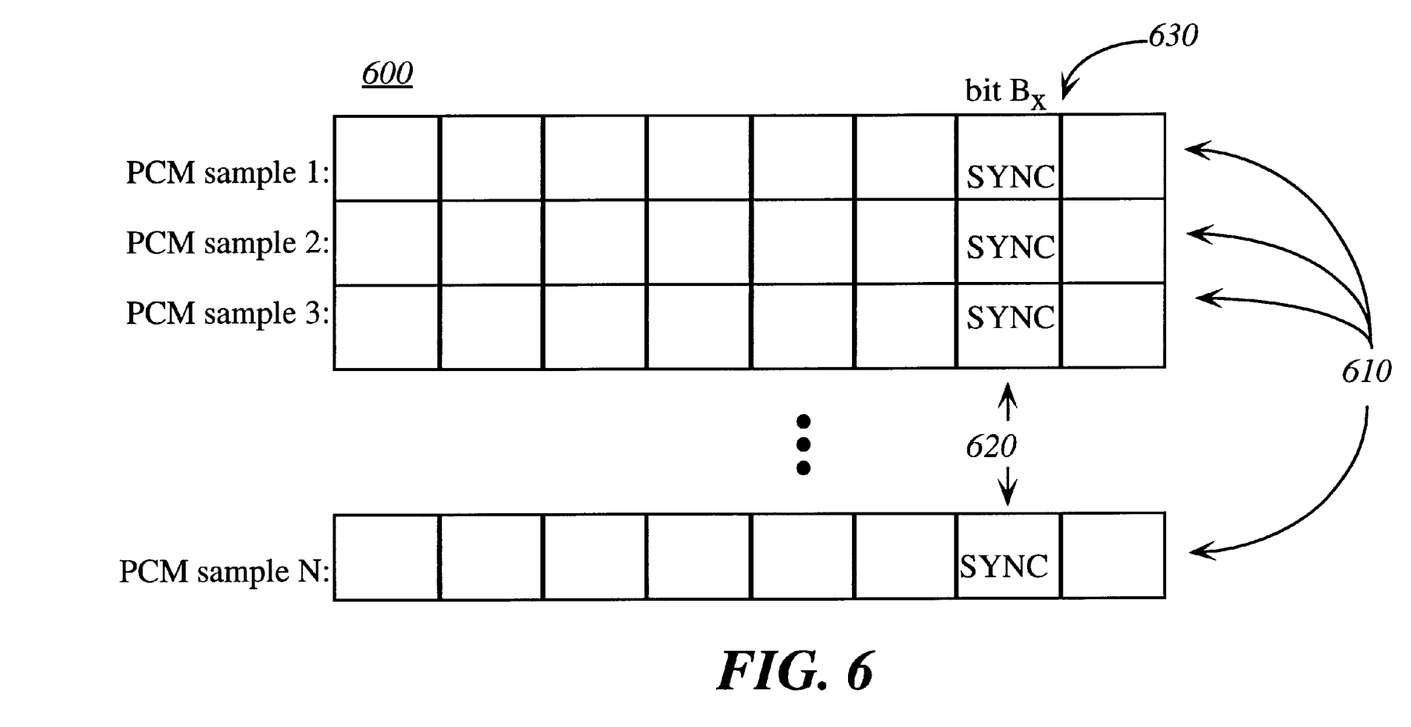
FIG. 6 is an illustrative embodiment of an ACTIVE sequence produced by a node, inclusive of the SYNC pattern.

Referring now to FIG. 6, ACTIVE sequence 600 also includes a sequence of PCM samples 610 encoded with a N-bit SYNC pattern 620. In this embodiment, successive bits of SYNC pattern 620 is encoded into bit $B_x$ 630 in successive, outgoing PCM samples. Similar to the encoding described above, bit $B_x$ 630 comprises bit 0 of each PCM sample of a PCM stream configured with a E1 carrier, while bit $B_x$ 630 comprises bit 1 of each PCM sample of a PCM stream configured in accordance with a T1 carrier as shown.

Referring back to FIG. 4, the transition to the ACTIVE1 state 410 occurs upon receiving a IDLE sequence as shown by transition 430. Herein, a transmitter of the node transitions to a compressed operating (COP) mode from its normal operating (NOP) mode. In this state, the node transmits the ACTIVE sequence while still monitoring for the reception of the IDLE or ACTIVE sequence. If synchronization with the node is lost, due to a call disconnection or call transfer for example, a transition 440 to the IDLE state 400 occurs. However, if the ACTIVE sequence is now detected, the node enters into the ACTIVE2 state 420 as represented by transition 450.

During the ACTIVE2 state 420, the node is operating in full TPT mode in which both its transmitter and receiver are placed in COP mode. The tandem channels are sending and receiving compressed PCM audio through the networking device. If synchronization between tandem channels is lost, the node either (i) returns to the ACTIVE1 state 410, if still detecting an IDLE sequence as represented by transition 460, or (ii) returns to the IDLE state 400 if both the ACTIVE and IDLE sequences are undetected as shown by transition 470. This may occur if the switched call is disconnected.

Figure 7A:
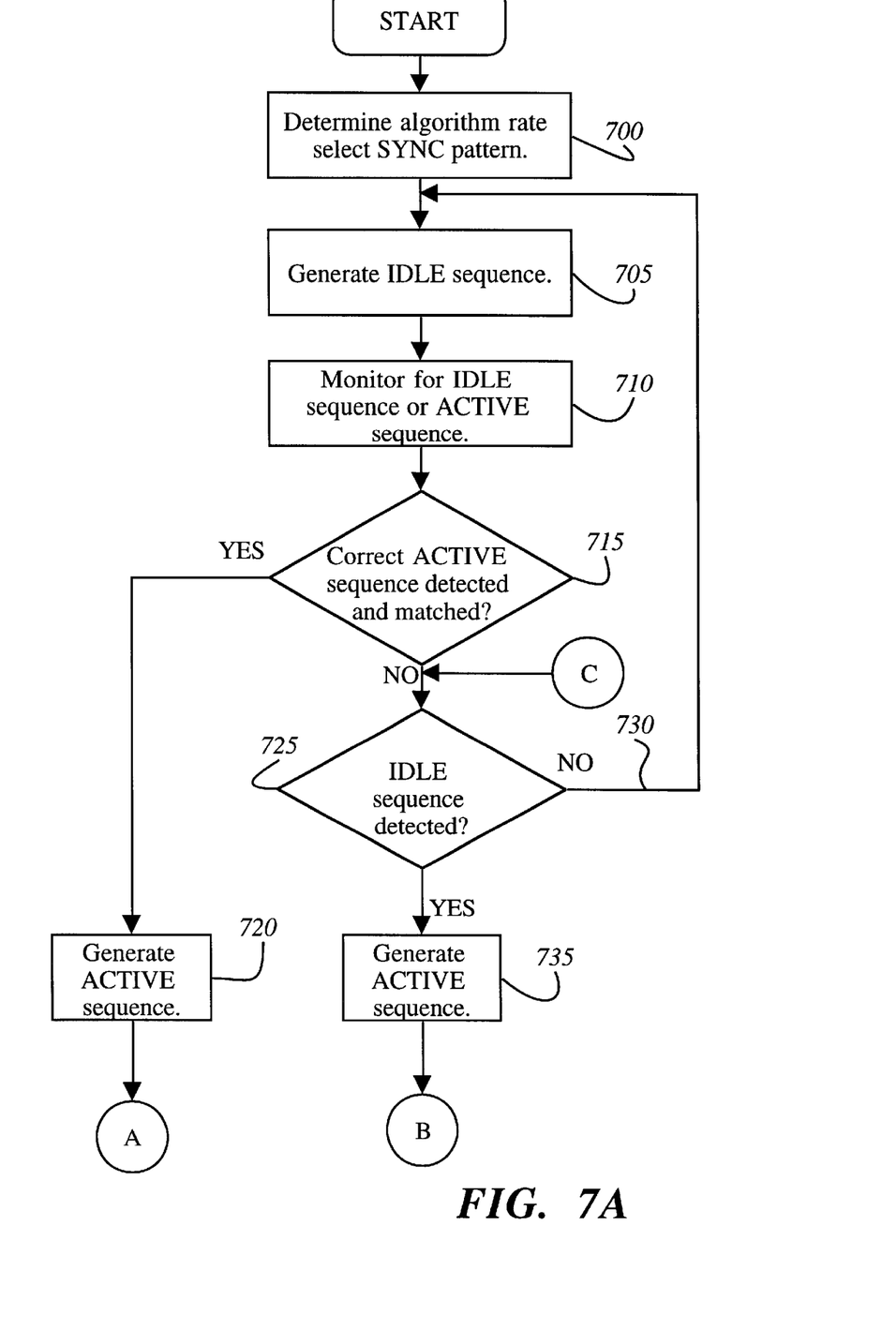
FIGS. 7A and 7B are illustrative embodiments of the operations of the tandem passthrough (TPT) detection procedure performed by a node of a tandem connection.
Figure 7B:
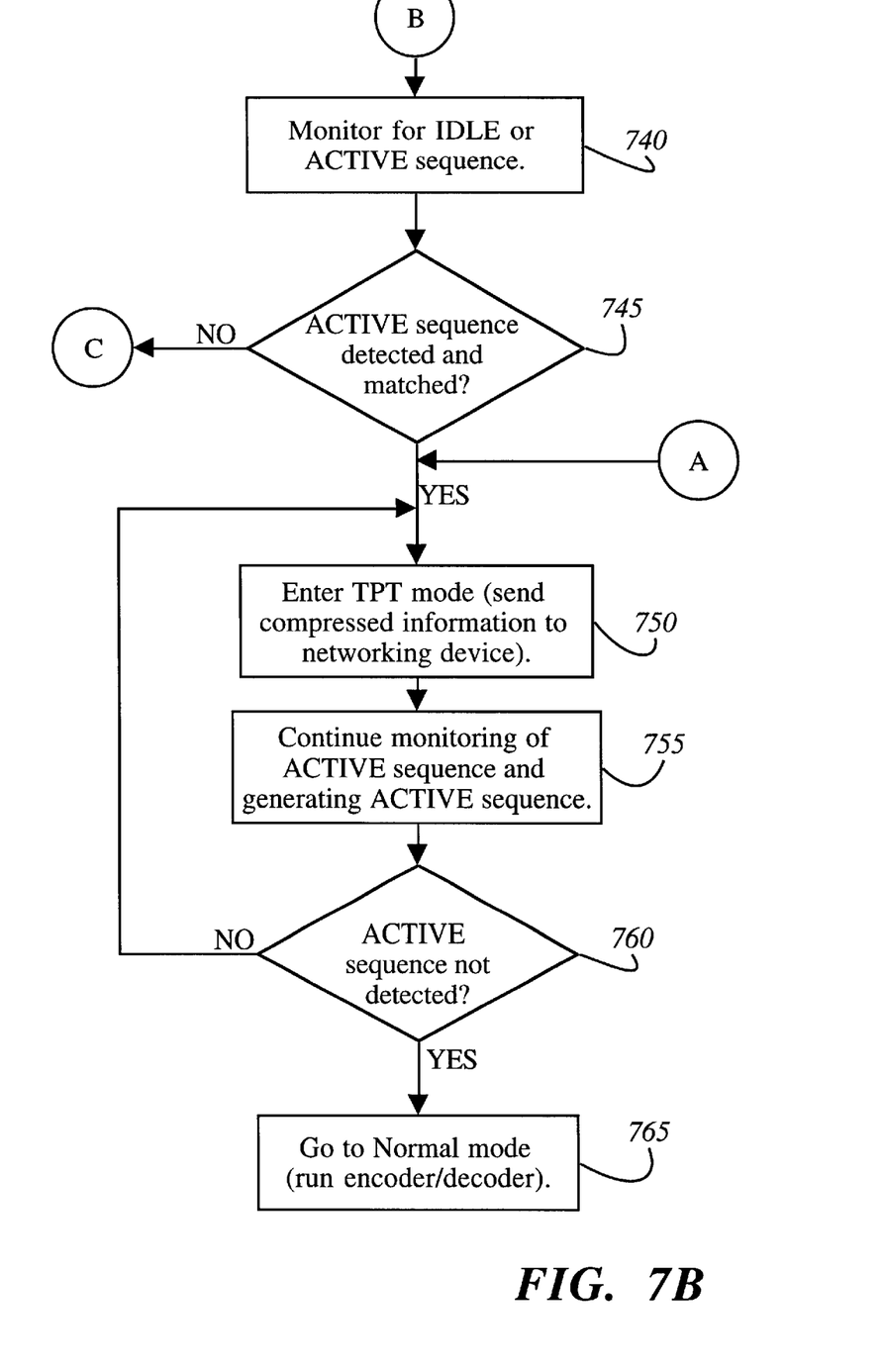

Referring to FIGS. 7A and 7B, an embodiment of the TPT detection procedure is shown. In a switched call network, where audio algorithms and rates are negotiated, tandem channels may be operating at different audio algorithms and rates. As a result, in block 700, a node internally (i) determines its audio algorithm and rate, and (ii) selects a corresponding SYNC pattern based on this determination as described above. Once the SYNC pattern is determined, the node produces an IDLE sequence (block 705) and continues to monitor incoming PCM samples for either an IDLE sequence or an ACTIVE sequence (block 710). If an ACTIVE sequence is detected (block 715), the node would determine whether or not that SYNC pattern matches its current audio algorithm. If not, the node continues to operate in the NOP mode to provide PCM samples through a tandem connection. However, upon detecting a matching SYNC pattern, the node will transition to the ACTIVE2 state and produce a responsive ACTIVE sequence (block 720).

Figure 8:
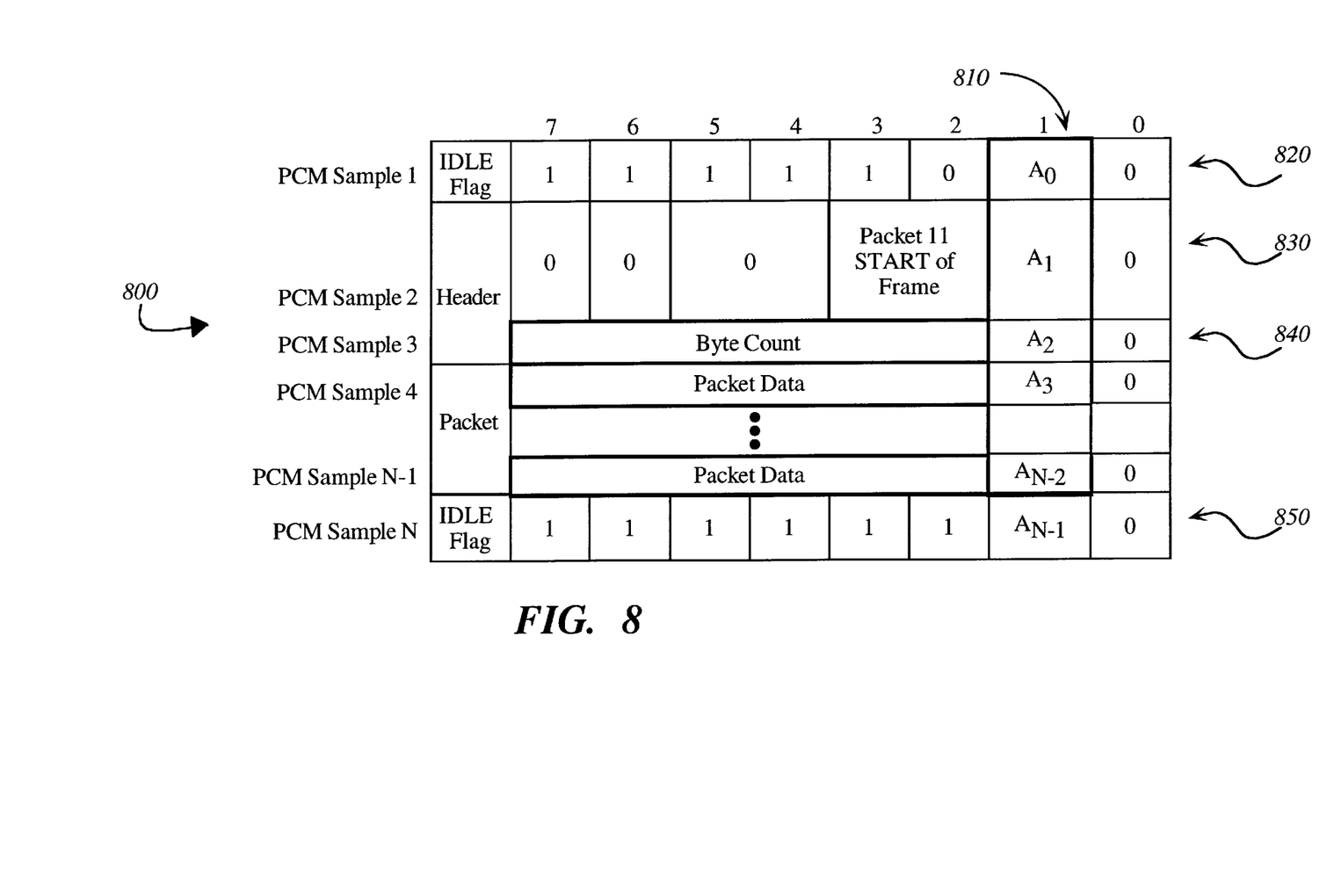
FIG. 8 is an illustrative embodiment of the data structure of compressed information transmitted over both tandem channels during an ACTIVE2 state of the node.

If the IDLE sequence is detected, the node also would determine whether or not that SYNC pattern matches its current audio algorithm (block 725). If not, the node will operate in the NOP mode and continue to generate the IDLE sequence (block 730). However, if there is a match, an ACTIVE sequence is produced by the node while that node continues to monitor for an incoming IDLE or ACTIVE sequence (blocks 735 and 740). Upon detection of an ACTIVE sequence, the node enters into the TPT mode in which compressed information, which is audio in this embodiment, is transferred through the networking device (blocks 745 and 750). One embodiment of the data structure of the compressed information is shown in FIG. 8. At this time, the node continues to produce an ACTIVE sequence and monitors for an incoming ACTIVE sequence (block 755). Once the ACTIVE sequence is not detected, the node returns to NOP mode in which decompressed PCM samples are transmitted through the networking device (blocks 760 and 765).

Referring now to FIG. 8, an embodiment of the data structure of a frame 800 of compressed information during an ACTIVE2 state is shown. The SYNC pattern 810 ($A_{N-1}$, $A_{N-2}$ ... $A_0$; each "A" being a binary value) is provided on bit $B_x$ (e.g., bit 1) of each 8-bit PCM sample of TPT frame 800. These PCM samples of TPT frame 800 include a first idle flag 820, a header 830, a data packet 840 and a second idle flag 850. The idle flags 820 and 850 are data samples sent between audio frames until the next audio frame is available for transmission. Header 830 provides a binary code to indicate the beginning of TPT frame 800 by setting bits 2 and 3 of the control code in this embodiment. Header 830 includes (i) a control code to indicate the frame types including a start of frame, and (ii) a byte count to indicate the amount of data provided in data packet 840.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
    exchanging information through a tandem connection in order to identify transmission characteristics through a plurality of signal lines separated by the tandem connection; and
    transferring information in a compressed format through the tandem connection if the plurality of signal lines utilizes the transmission characteristics.

2. A method comprising:
    exchanging information through a tandem connection in order to identify transmission characteristics through a plurality of signal lines separated by the tandem connection, the transmission characteristics include a rate of transmission of the information and a compression function; and
    transferring information in a compressed format through the tandem connection if the plurality of signal lines utilizes the transmission characteristics.

3. The method of claim 1, wherein the information exchanged in order to identify the transmission characteristics through the plurality of signal lines is encoded.

4. The method of claim 3, wherein prior to the exchanging of the encoded information, the method farther comprising:
    detecting the tandem connection being a networking device positioned between a first node coupled to a first signal line of the plurality of signal lines and a second node coupled to a second signal line of the plurality of signal lines.

5. The method of claim 3, wherein the operation of exchanging the encoded information comprising:
    transferring a sequence of modulated samples from the first node through the tandem connection, each $M^{th}$ sample of the sequence being encoded with at least one bit of a first synchronization pattern, where "M" is a positive whole number greater than 7.

6. The method of claim 5, wherein the operation of exchanging of the encoded information further comprising:
    repeatedly encoding each $M^{th}$ sample of the sequence in order to provide the first synchronization pattern to the second node.

7. The method of claim 6, wherein the operation of exchanging of the encoded information further comprising:
    monitoring an incoming sequence of modulated samples for a second synchronization pattern from the second node.

8. The method of claim 7, wherein the operation of exchanging of the encoded information farther comprising:
    encoding each sample of the sequence once the second synchronization pattern from the second node is detected by the first node.

9. The method of claim 7, wherein the operation of exchanging of the encoded information further comprising:

encoding each sample of the sequence once the second synchronization pattern from the second node is detected to be encoded in each modulated sample of the sequence.

10. The method of claim 7, wherein the operation of exchanging of the encoded information further comprising:

repeatedly encoding each $(M-1)^{st}$ sample of the sequence when the first node fails to detect the second synchronization pattern from the second node.

11. The method of claim 7, wherein the second synchronization pattern identifies a compression function used by the first node and a transmission rate.

12. A method comprising:

exchanging encoded information through a tandem connection in order to identify both a rate of transmission supported by a plurality of signal lines separated by the tandem connection and a compression function used to compress the information; and transferring the compressed information without prior decompression through the tandem connection if the plurality of signal lines support the same rate of transmission and compression function.

13. The method of claim 12, wherein the exchanging of the encoded information further identifies a compression function support by the plurality of signal lines.

14. A method comprising:

detecting a tandem connection separating a first signal line from a second signal line;

analyzing encoded information through the tandem connection in order to identify a first rate of transmission and a first compression function supported by the first signal line and a second rate of transmission and a second compression function supported by the second signal line; and transferring information in a compressed format through the tandem connection without decompressing the compressed information before transmission over the second line if the first rate of transmission and the first compression function are equivalent to the second rate of transmission and the second compression function.

15. The method of claim 14, wherein the encoded information includes a sequence of modulated samples, each $M^{th}$ sample of the sequence being encoded with at least one bit of a synchronization pattern, where "M" is a positive whole number typically greater than 20.

16. The method of claim 15, wherein the operation of exchanging of the encoded information comprising:

repeatedly encoding each $M^{th}$ sample of the sequence in order to progress the synchronization pattern through the second signal line.

17. The method of claim 16, wherein the operation of exchanging of the encoded information further comprising:

continuously monitoring an incoming sequence of modulated samples progressing over the first signal line for a synchronization pattern.

18. A system for transferring information in a compressed format through a tandem connection separating a plurality of nodes, each node including executable code configured for storage on a computer-readable memory, the executable code including a plurality of modules each configured to perform at least one function, the system comprising:

a first module configured to record a predetermined portion of selected samples of incoming information;

a second module configured to detect whether a bit pattern produced by the predetermined portions of the selected samples matches a predetermined bit sequence; and a third module configured to place a first node in an operational state to transfer compressed information through the tandem connection to a second node separated from the first node by the tandem connection.

19. A communication module comprising:

a substrate;

a memory unit for containing software to control an exchange of information in a compressed format over a tandem connection between a first signal line and a second signal line; and at least one processor unit executing the software to control the exchange of the information over the tandem connection by transmitting the information in the compressed format when the at least one processor determines that a compression function supported by the first signal line is identical to the compression function supported by the second signal line.

\* \* \* \* \*